(12) United States Patent  
Terwilliger et al.

(10) Patent No.: US 9,098,499 B2  
(45) Date of Patent: *Aug. 4, 2015

(54) AUTOMATED INFORMATION HANDLING SYSTEM COMPONENT COMPATIBILITY

(71) Applicant: Dell Products L.P., Round Rock, TX (US)

(72) Inventors: Kevin D. Terwilliger, Austin, TX (US); Scott C. Lauffer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,803

(22) Filed: Aug. 19, 2014

(65) Prior Publication Data

US 2014/0353374 A1    Dec. 4, 2014

Related U.S. Application Data

(63) Continuation of application No. 13/829,872, filed on Mar. 14, 2013, now Pat. No. 8,827,149.

(51) Int. Cl.
| | |
|---|---|
| *G06F 17/00* | (2006.01) |
| *G06F 17/30* | (2006.01) |
| *G06K 7/14* | (2006.01) |
| *G06Q 10/08* | (2012.01) |
| *G06Q 10/00* | (2012.01) |

(52) U.S. Cl.
CPC ............. *G06F 17/30* (2013.01); *G06K 7/1404* (2013.01); *G06Q 10/087* (2013.01); *G06Q 10/20* (2013.01)

(58) Field of Classification Search
CPC .......... G06F 17/00; G06K 7/10; G06K 19/00; G06K 9/80; G06K 9/36; G06K 9/18
USPC .......................... 235/375, 487, 462.09, 462.1
See application file for complete search history.

(56) References Cited

U.S. PATENT DOCUMENTS

| | | |
|---|---|---|
| 4,958,064 A | 9/1990 | Kirkpatrick |
| 5,502,814 A | 3/1996 | Yuuki et al. |
| 5,636,008 A | 6/1997 | LoBiondo et al. |
| 5,668,696 A | 9/1997 | Schmitt |
| 5,979,757 A | 11/1999 | Tracy et al. |
| 6,036,087 A | 3/2000 | Hong et al. |
| 6,233,408 B1 | 5/2001 | Allen |
| 6,525,698 B1 | 2/2003 | Takechi et al. |
| 6,997,384 B2 | 2/2006 | Hara |

(Continued)

FOREIGN PATENT DOCUMENTS

JP        2005346577 A       12/2005

*Primary Examiner* — Edwyn Labaze
(74) *Attorney, Agent, or Firm* — Terrile, Cannatti, Chambers & Holland, LLP; Robert W. Holland

(57) ABSTRACT

An application running on portable information handling system automatically inventories the portable information handling system to identify one or more components that perform one or more functions based upon information embedded in a barcode. For example, a barcode affixed to an information handling system identifies the information handling system as having a near field communication (NFC) device. The application searches the portable information handling system to determine if the portable information handling system has a NFC device and, if so, presents an activator at a display to use the NFC device to communicate with the information handling system NFC device.

20 Claims, 2 Drawing Sheets

(56) References Cited

U.S. PATENT DOCUMENTS

| | | |
|---|---|---|
| 7,591,383 B1 | 9/2009 | Milton |
| 2002/0095487 A1 | 7/2002 | Day et al. |
| 2003/0061312 A1 | 3/2003 | Bodner et al. |
| 2003/0128174 A1 | 7/2003 | Scheibe |
| 2003/0213839 A1 | 11/2003 | Riggert et al. |
| 2004/0178270 A1 | 9/2004 | Pradhan |
| 2007/0084978 A1 | 4/2007 | Martin et al. |
| 2008/0218437 A1 | 9/2008 | Shimoi |
| 2009/0108057 A1 | 4/2009 | Mu et al. |
| 2009/0289764 A1 | 11/2009 | Chiu |
| 2010/0057900 A1 | 3/2010 | Ootsuka |
| 2010/0149355 A1 | 6/2010 | Koshiba et al. |
| 2010/0225653 A1 | 9/2010 | Sao et al. |
| 2010/0261502 A1 | 10/2010 | Martin-Cocher et al. |
| 2011/0069049 A1 | 3/2011 | Wong et al. |
| 2011/0085196 A1 | 4/2011 | Liu et al. |
| 2011/0085732 A1 | 4/2011 | Cheng |
| 2011/0164163 A1 | 7/2011 | Bilbrey et al. |
| 2011/0218730 A1 | 9/2011 | Rider et al. |
| 2011/0241833 A1 | 10/2011 | Martin et al. |
| 2012/0008161 A1 | 1/2012 | Rouhana |
| 2012/0026530 A1 | 2/2012 | Tsongas et al. |
| 2012/0131416 A1 | 5/2012 | Dugan et al. |
| 2012/0175412 A1* | 7/2012 | Grabiner et al. .............. 235/375 |
| 2012/0194854 A1 | 8/2012 | Tang et al. |
| 2012/0258715 A1 | 10/2012 | Souissi et al. |
| 2012/0303323 A1 | 11/2012 | Ha et al. |
| 2012/0329386 A1 | 12/2012 | Reyner |
| 2013/0032634 A1 | 2/2013 | McKirdy |
| 2013/0069781 A1 | 3/2013 | Terwilliger et al. |
| 2013/0069794 A1 | 3/2013 | Terwilliger et al. |
| 2013/0110682 A1 | 5/2013 | Rosenblatt et al. |
| 2014/0203071 A1* | 7/2014 | Eggert ......................... 235/375 |

\* cited by examiner

AUTOMATED INFORMATION HANDLING SYSTEM COMPONENT COMPATIBILITY

BACKGROUND OF THE INVENTION

1. Field of the Invention

The present invention relates in general to the field of information handling system processing, and more particularly to an automated information handling component compatibility.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are built from a wide variety of components that provide a variety of different functions with a variety of different capabilities. Enterprises and individuals leverage this flexibility by selecting information handling systems on a cost and performance basis. For example, an individual who uses an information handling system for web browsing and multimedia viewing may purchase a system with more expensive graphics components, while an individual who uses an information handling system for word processing and spreadsheet analysis may purchase a system with more expensive processing and memory components and only a basic graphics system. As another example, enterprises purchase server information handling systems with similar considerations that balance network and storage capabilities. For instance, an enterprise might purchase basic server systems to work in tandem to support an e-commerce website and a more expensive server system to manage and administer the e-commerce website resources. The more expensive server system typically includes more processing capabilities and built-in redundancy to protect against system outages.

Often, more expensive information handling systems include "bells and whistles" that provide additional functionality. One example is extra wireless networking capabilities to support peripherals through wireless communications. For instance, wireless display interfaces are found in some portable information handling systems. As another example, Bluetooth and other wireless personal area networking interfaces support wireless communications with keyboard, mouse and other peripheral devices. Another close range communication device is a near field communication (NFC) device that provides "tap" communications with radio communications. NFC devices have found their way into mobile telephone information handling systems as a convenient way to transfer information over short distances, such as business cards, phone numbers or music playlists. NFC devices have also found their way into a variety of peripheral devices to store configuration and networking information for the peripheral devices. For instance, an enterprise might put wireless local area network information for a projector display on an NFC device disposed in a display so that an end user can retrieve the configuration information with an NFC communication and apply the configuration information to use the projector display. Although wireless communications capabilities simplify an end user's interaction with information handling systems and peripherals, these wireless capabilities too often go unused because end users either do not know that the capabilities are present or do not understand how to use the wireless capabilities.

SUMMARY OF THE INVENTION

Therefore a need has arisen for a system and method which provides end user's with information about the capabilities of an information handling system or peripheral.

In accordance with the present invention, a system and method are provided which substantially reduce the disadvantages and problems associated with previous methods and systems for presenting information handling system capabilities to an end user for use by the end user. A barcode includes component identifier information of a target information handling system. The component identifier information is extracted and applied at a portable information handling system to determine compatible communications components or other functions shared by the target and portable information handling system. Automated component capability comparison at the portable information handling system allows automated activation of a communication medium that an end user might otherwise not have been aware of, such as that provided by a NFC device.

More specifically, a QR code is associated with a target information handling system, such as a laptop or server information handling system. The QR code advertises a component list associated with the target system, such as wireless communication media supported by the target information handling system. A camera of a portable information handling system, such as a mobile telephone, captures an image of the QR code so that a barcode reader can extract the component list. The mobile telephone then automatically searches its own capabilities to determine compatible communications media shared with the target information handling system, such as the presence of a NFC device. If the mobile telephone has a NFC device, activation of the NFC device to communicate with the target system is automatically provided, such as by presenting an activation button and NFC device instructions at a display of the mobile telephone.

The present invention provides a number of important technical advantages. One example of an important technical advantage is that wireless communication capabilities that an end user is capable of using are made known to the end user by scanning a QR code of a device to initiate an automated comparison of the end user's information handling system and identify capabilities in the end user information handling system that are identified as present in the device by the QR code. For example, if an end user QR code scan indicates that NFC capabilities are present in a device and supported by an end user's information handling system, then the NFC capabilities are enabled and flagged for the end user to access. Wireless capabilities, such as NFC or WPAN capabilities that might otherwise pass unused by an end user will instead become a tool that provides an improved end user experience with the information handling system and wireless capable devices.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automated comparison of components at a portable information handling system provides an end user with activation of wireless communication in response to barcode information of available communication media of a target information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
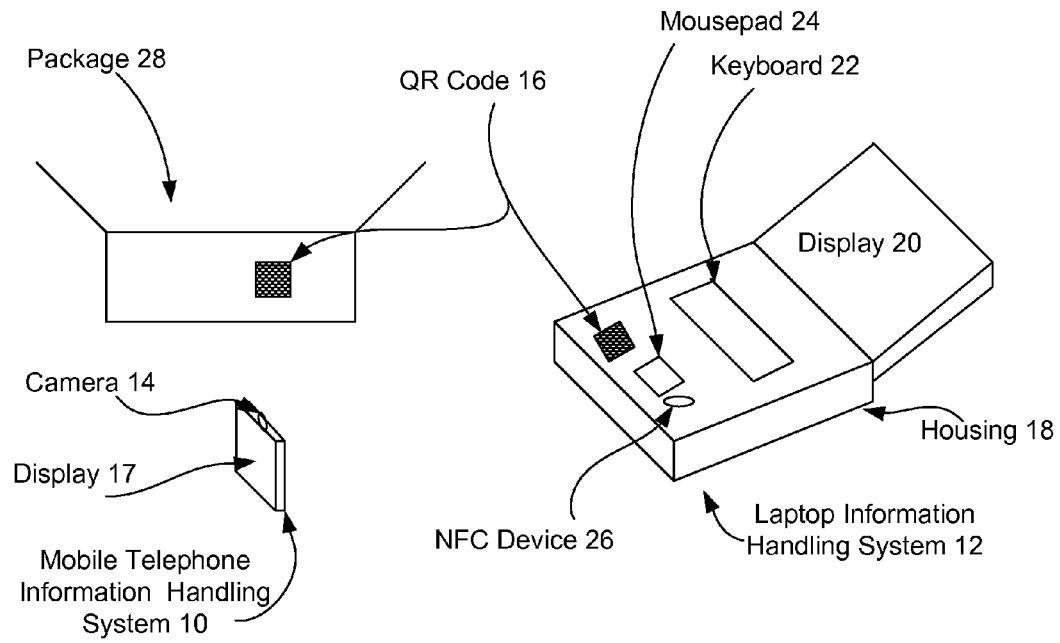
FIG. 1 depicts a portable information handling system that inventories capabilities to interface with an information handling system based upon QR code information.

Referring now to FIG. 1, a portable information handling system 10 is depicted that inventories capabilities to interface with an information handling system 12 based upon QR code information. In the example embodiment, portable information handling system 10 is a mobile telephone portable information handling system having a telephone handset form factor and "smartphone" capabilities. Mobile telephone information handling system 10 communicates with a target portable information handling system 12 having a laptop form factor. In alternative embodiments, communication may be desired between any of plural types of information handling systems, such as a laptop with a server information handling system, a tablet with a desktop information handling system, etc . . . . In order to establish communication or other desired functions, one information handling system provides information in a barcode about a capability and the other performs a search to determine if a component exists to perform the capability. Although the example embodiment depicts a search to support a wireless NFC communication capability, in alternative embodiments other types of functions and capabilities may be used.

In the example embodiment, mobile telephone information handling system 10 has a camera 14 that captures images and a display 17 that presents information as visual images. An end user uses camera 14 to capture an image of a QR code 16 or other type of barcode associated with the target laptop information handling system 12. Laptop information handling system 12 has a portable housing 18 with an integrated display 20, keyboard 22 and mousepad 24. Located proximate mousepad 24 within housing 18 is a NFC device 26 that communicates with NFC radio communications. Other types of wireless communications within laptop information handling system 12 may include 60 GHZ short range transceivers, such as for supporting a wireless display, Bluetooth wireless transceivers for interfacing with peripheral devices, and transceivers in other frequency ranges. QR code 16 includes information that identifies the wireless communication capabilities and other functions of laptop information handling system 12. Mobile telephone information handling system 10 extracts the information from QR code 16 and applies the information to search its own components for compatibility with the components and functions identified in QR code 16. For instance, QR code 16 includes an identifier that indicates the presence of NFC device 26 proximate mousepad 24; mobile telephone information handling system 10 extracts the identifier, searches its own components for a NFC device and, if an NFC device is present, activates the NFC device for interaction with NFC device 26 of laptop information handling system 12.

In one example embodiment, QR code 16 is placed proximate the location of NFC device 26 so that an end user will scan QR code 16 for information on how to interact with NFC device 26. In such a situation, if the mobile telephone information handling system searches for and fails to find an NFC device of its own, information about NFC device 26 presented at mobile information handling system 10 may be truncated or eliminated to prevent end user confusion. In another example embodiment, QR codes 16 placed in other locations associated with target laptop information handling system 12 may have other primary purposes but include component identity information as an added item that is only presented to an end user if mobile telephone information handling system 10 has compatible components. For example, a QR code 16 affixed to a package 28 with shipping information, such as a shipping address, or registration information, such as warranty registration, also includes a component list of wireless communication devices included in laptop information handling system 12. When an end user scans QR code 16 from package 28, the component list information is extracted so that mobile information handling system 10 can search its wireless communication components for compatibility with the component list information and present potential communication media on display 17 for wireless communication between mobile telephone information handling system 10 and laptop information handling system 12. As a specific example, if a registration QR code 16 on package 28 or other locations of housing 18 includes an NFC device 26 in its component list, then mobile telephone information handling 10 will automatically search for its own NFC device and, if an NFC device is found, will activate the NFC device for performing the registration.

Figure 2:
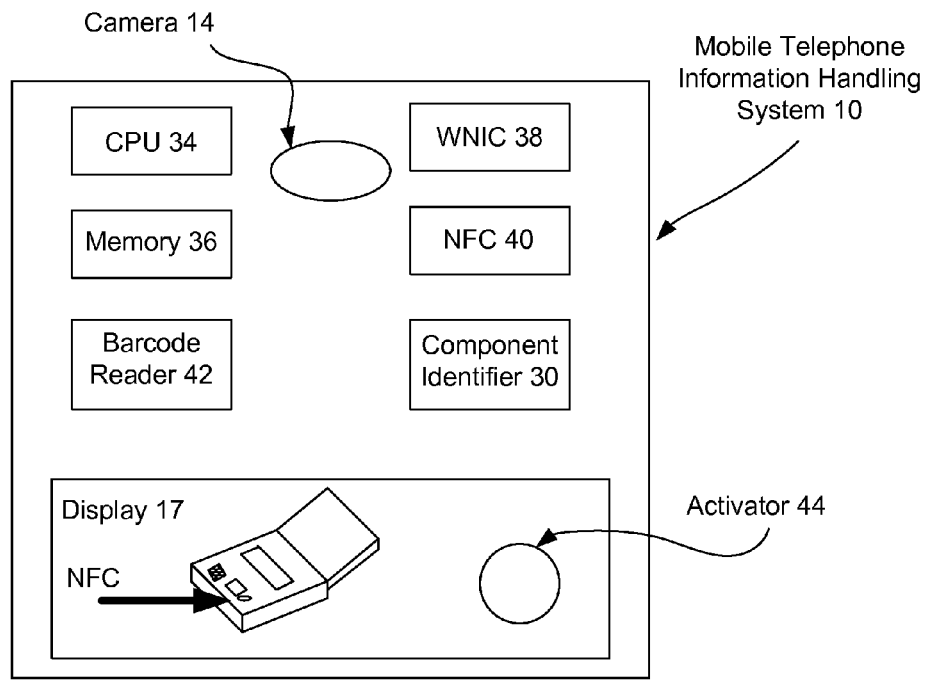
FIG. 2 depicts a portable information handling system having a component identifier module.

Referring now to FIG. 2, a portable information handling system 10 is depicted having a component identifier module 30 for performing a search of components in response to information extracted from a QR code 16. Portable information handling system 10 has a housing 32 with a form factor of a mobile phone handset. A processor 34 executes instructions stored in a memory 36, such as application instruction to process information. Mobile information handling system 10 includes a wireless network interface card (WNIC) 38 that supports wireless communications, such as wireless wide area network (WWAN), wireless local area network (WLAN) and wireless personal area (WPAN) communications. An NFC device 40 supports near field communications. WNIC 38 and NFC device 40 interface with processor 34 so that an end user can run an application to wirelessly communicate information. A camera 14 interfaces with processor 34 to capture images for use by applications running on processor 34. In the example embodiment, information handling system 10 is a smartphone that has tablet-like functionality with wireless telephone network service capability to support Internet and other network interfaces.

In the example embodiment, once camera 14 captures an image of a QR code, a barcode reader 42 decodes the QR code to extract information embedded in the QR code. Component identifier module 30 obtains any component list information included with QR code 16 and applies the component list information to search information handling system 10 for compatible components. For instance, if the component list indicates that a target information handling system includes a Bluetooth transceiver that provides Bluetooth wireless functionality, component identifier module 30 searches portable information handling system 10 to determine if a Bluetooth transceiver is present. If a Bluetooth transceiver is not present, then no action is taken to present to the end user information about the Bluetooth transceiver of the target information handling system 12. As another example, if component list information extracted by barcode reader 42 indicates that the target information handling system includes NFC device 26, then component identifier module 30 performs a search to determine if a compatible NFC device is included with portable information handling system 10. Upon finding NFC device 40, such as in a look-up table populated with an list of components, component identifier module 30 presents a depiction at display 17 of the target information handling system 12 with an indication of the location of NFC device 26 and an activator 44 that an end user can select to activate use of NFC device 40.

Figure 3:
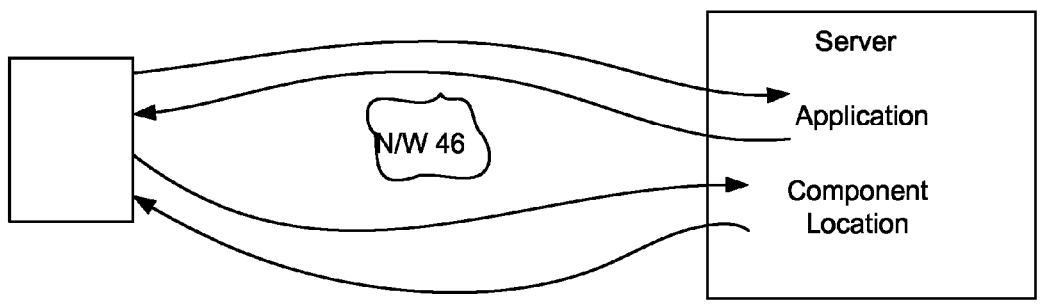
FIG. 3 depicts a flow diagram of providing a portable information handling system capabilities list.

Referring now to FIG. 3, a flow diagram depicts a process for providing a portable information handling system component capabilities compatibility. The process starts at portable information handling system 10 with scanning of a barcode, such as a QR code, that includes component list information. If component identifier module 30 is not installed on portable information handling system 10, then a URL in the barcode is used to interface through a network 46, such as the Internet, with a server information handling system 48. Server information handling system 48 responds to the network communication by providing an application for performing a search of components, such as component identifier module 30, through network 46 to portable information handling system 10. Portable information handling system 10 installs the application and performs a search of the component list provided by QR code 16 to determine compatible components on portable information handling system 10. If compatible components are found, portable information handling system 10 requests through network 46 a location of the components stored on server information handling system 48 plus any drivers or other software, such as encryption keys, that might be needed to use the identified component to communicate with the target information handling system 12 associated with QR code 16. Server information handling system 48 sends the location and other information to portable information handling system 10, which presents the location and instructions for use of the component at a display along with an activator that the end user can select to activate the component function.

Figure 4:
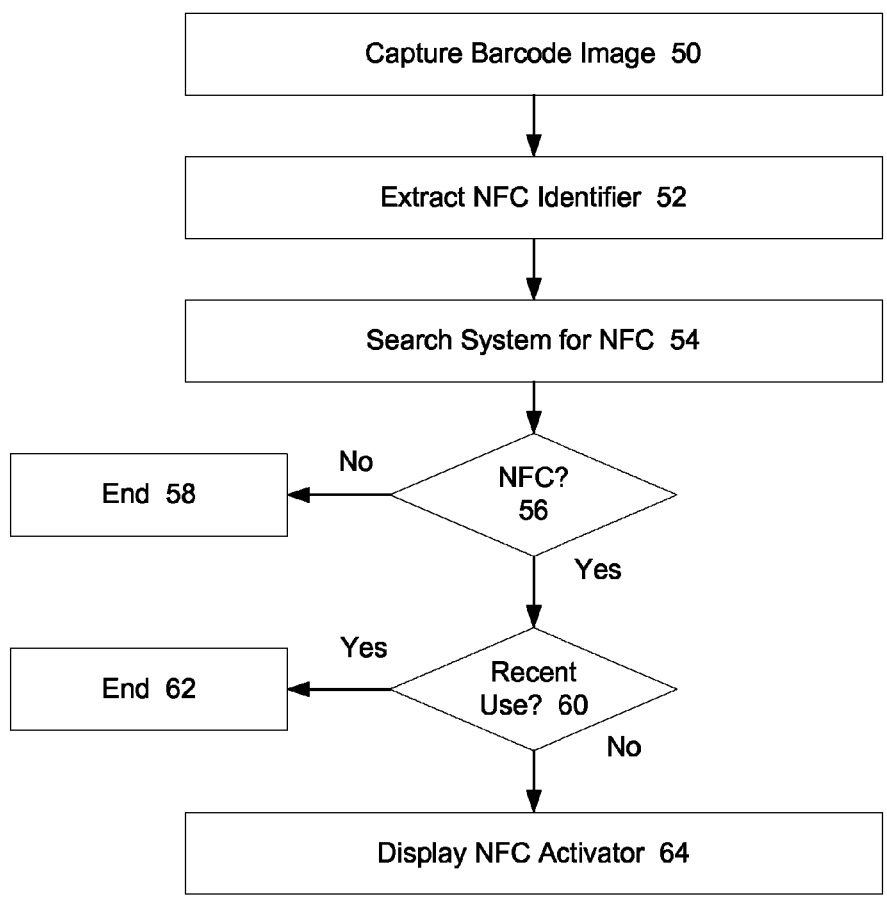
FIG. 4 depicts a flow diagram of a process for comparing information handling system capabilities.

Referring now to FIG. 4, a flow diagram depicts a process for determining a component list of compatible information handling system capabilities. The process starts at step 50 with capture of an image of a barcode, such as a QR code with a portable information handling system. At step 52, an identifier is extracted from the barcode that indicates a presence of a NFC device in a target information handling system associated with the barcode. At step 54, the portable information handling system responds to the NFC identifier by automatically searching its components for a compatible NFC component. At step 56, a determination is made of whether a NFC device is available on the portable information handling system that is compatible with the target information handling system associated with the barcode. If not, the process ends at step 58. If a compatible NFC device is found, the process continues to step 60 to determine whether the NFC device found on the portable information handling system has had recent use. If so, the process ends at step 62 with some highlight of the NFC capability of the target information handling system. At step 62, since the end user has familiarity with the NFC capability, the process assumes the end user will activate NFC if the end user desires to do so. If at step 60 recent use of the NFC device is not found, at step 64 the process presents an activation button that the end user may touch to activate NFC functionality. In alternative embodiments, tips on NFC use may be displayed or NFC functionality may be automatically activated.

Although the present invention has been described in detail, it should be understood that various changes, substitutions and alterations can be made hereto without departing from the spirit and scope of the invention as defined by the appended claims.

What is claimed is:

1. A method for interacting between first and second electronic devices, the method comprising:
    capturing an image of the first electronic device with a camera integrated in the second electronic device;
    extracting a component identifier from the image with the second electronic device;
    determining that the second electronic device has a physical component with the component identifier, the physical component integrated in a housing of the second electronic device; and
    in response to determining, presenting a function associated with the physical component at a display of the second electronic device.

2. The method of claim 1 wherein extracting a component identifier further comprises reading information embedded in a barcode captured in the image.

3. The method of claim 2 wherein the second electronic device comprises a mobile telephone.

4. The method of claim 3 wherein the first electronic device comprises a server information handling system.

5. The method of claim 1 wherein the component identifier comprises an NFC device.

6. The method of claim 5 wherein presenting a function comprises presenting an image at the display of the second electronic device that depicts a location of the NFC device of the first electronic device.

7. The method of claim 5 wherein presenting a function comprises presenting an activator at the display, the activator operable to activate the NFC device of the second electronic device to interact with the NFC device disposed in the first electronic device.

8. The method of claim 1 wherein extracting a component identifier further comprises reading information from a barcode captured in the image, the information including a wireless device identifier.

9. The method of claim 8 further comprising automatically establishing a wireless interface with the wireless device between the first and second electronic devices.

10. The method of claim 1 further comprising:
failing to locate the component; and
in response to failing to locate the component, disregarding the information associated with the component.

11. An electronic device comprising:
a display operable to present information as visual images;
a wireless communication device;
a camera operable to capture images; and
a component identifier module operable to analyze an image captured by the camera of a second electronic device to identify an integrated component of the second electronic device that communicates wirelessly with the wireless communication device and to present an interface at the display for using the wireless communication device and the integrated component to communicate.

12. The electronic device of claim 11 wherein the integrated component comprises an NFC device.

13. The electronic device of claim 12 wherein the interface comprises an activator operable to activate the wireless communication device to interact with the NFC device.

14. The electronic device of claim 13 wherein the interface comprises a depiction of the NFC device location.

15. The electronic device of claim 14 further comprising a barcode reader operable to extract barcode information from a barcode captured in the image by the camera, wherein the component identifier module identifies the integrated component with a component identifier embedded in the barcode.

16. The electronic device of claim 15 wherein the barcode comprises a QR code.

17. A system for automated electronic device capability compatibility, the system comprising:
a component identifier module stored in non-transitory memory of a first electronic device and having instructions to:
extract information from an image of a second electronic device, the image captured by a camera integrated in the first electronic device;
search for a physical component integrated in the first electronic device based upon the information extracted from the image; and
in response to finding the physical component, presenting an activator at a display of the first electronic device for activation of the physical component to perform a function compatible with the second electronic device.

18. The system of claim 17 wherein the physical component comprises a NFC device and the function compatible with the second electronic device comprises retrieving information with the first electronic device NFC device from the second electronic device NFC device.

19. The system of claim 18 wherein the image includes a barcode and the function comprises a function defined by information embedded in the barcode.

20. The system of claim 19 wherein the barcode comprises a QR code.

* * * * *